Dec. 19, 1933.　　　W. D. AVERILL　　　1,940,112
MILLING MACHINE
Filed Jan. 9, 1930　　　3 Sheets-Sheet 1

Inventor
WILLIAM D. AVERILL
By H. K. Parsons
Attorney

Dec. 19, 1933.　　　W. D. AVERILL　　　1,940,112
MILLING MACHINE
Filed Jan. 9, 1930　　　3 Sheets-Sheet 2
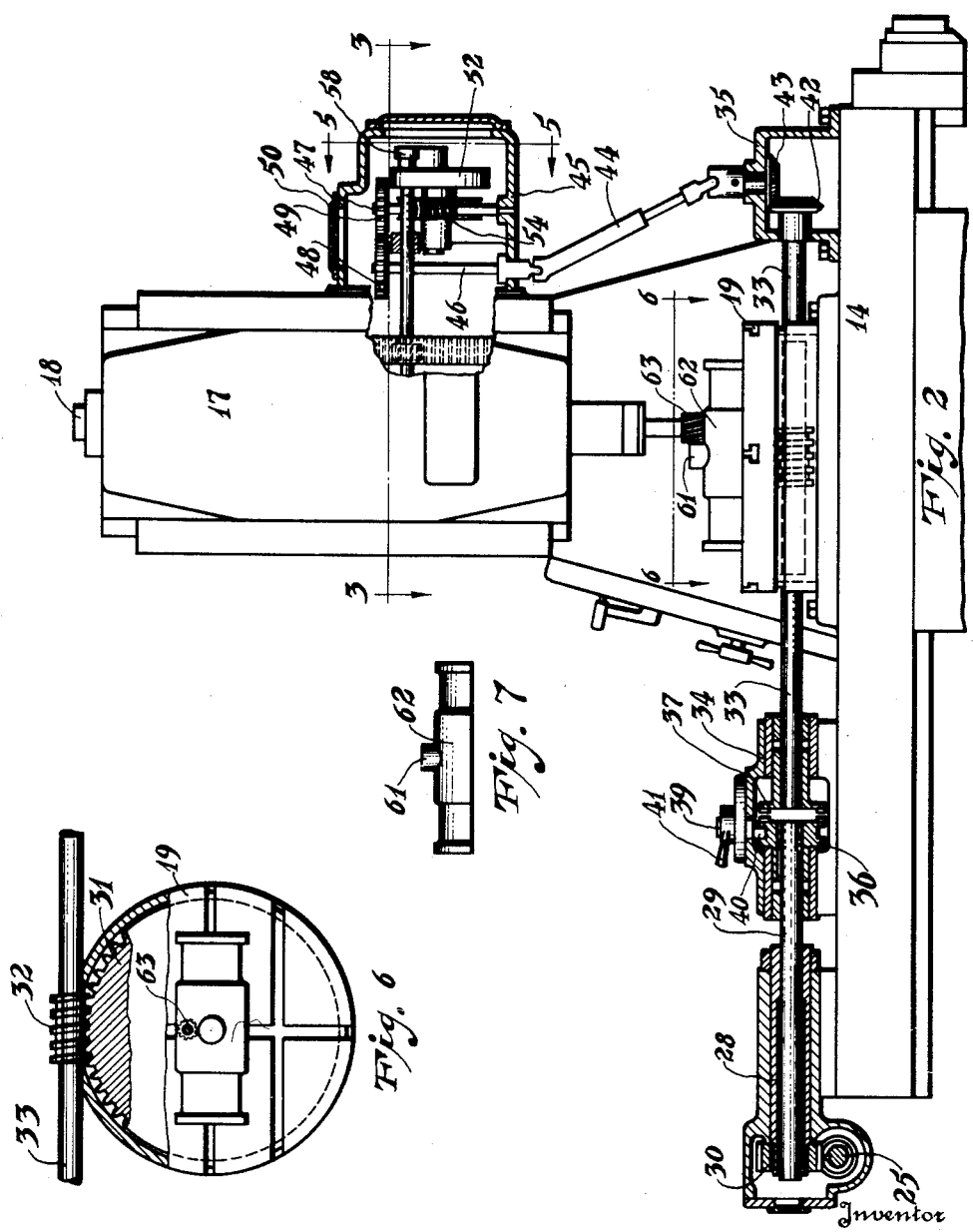
WILLIAM D. AVERILL
By AHK Parsons
Attorney Dec. 19, 1933.    W. D. AVERILL    1,940,112
MILLING MACHINE
Filed Jan. 9, 1930    3 Sheets-Sheet 3

Inventor
WILLIAM D. AVERILL
By H. K. Parsons
Attorney

Patented Dec. 19, 1933

1,940,112

UNITED STATES PATENT OFFICE

1,940,112

MILLING MACHINE

William D. Averill, Cincinnati, Ohio, assignor to The Cincinnati Milling Machine Company, Cincinnati, Ohio, a corporation of Ohio Application January 9, 1930. Serial No. 419,670

6 Claims. (Cl. 90—19)

This invention relates to milling machines and more particularly to improvements in a vertical milling machine having a rotatable work table.

One of the objects of this invention is the provision of a vertical milling machine adapted to mill or finish curvilinear surfaces, the elements of which vary in extent.

A further object of this invention is the provision of an improved attachment for a vertical spindle milling machine having a rotatable work table wherein the table may be rotated and the spindle reciprocated in definite timed relation to one another.

Other objects and advantages of the present invention should be readily apparent by reference to the following specification, considered in conjunction with the accompanying drawings illustrative of one embodiment thereof, but it will be understood that any modifications may be made in the exact structural details hereinafter disclosed, within the scope of the appended claims, without departing from or exceeding the spirit of the invention.

Referring to the drawings, in which like reference numerals indicate like parts:

Figure 2 is a front elevation of the machine properly in section;

Figure 6 is a plan view, partly in section, as on the line 6—6 of Figure 2;

Figure 7 is a detail of a work piece adapted to be finished in this machine.

Figure 1:
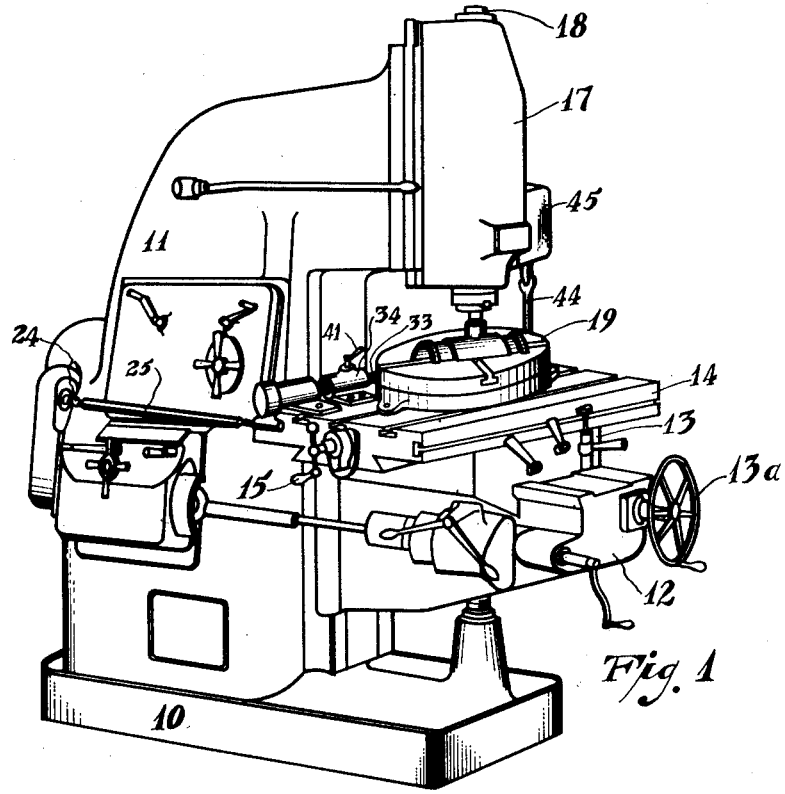
Figure 1 is an elevation of the machine showing one embodiment of the invention.

The reference numeral 10 indicates the base of the machine having a vertical column 11, upon which is slidably mounted the knee 12 which carries the saddle 13 for movement in and out toward the column. The handle 13a is mounted on the knee for this purpose and has suitable connection with the saddle for moving it. The table 14 is slidably mounted on the saddle and is provided with a handle 15 for effecting horizontal adjustment. The column 11 is provided with guideways 16, upon which is mounted, for vertical movement, the head 17 carrying the rotatable cutter spindle 18.

Figure 4:
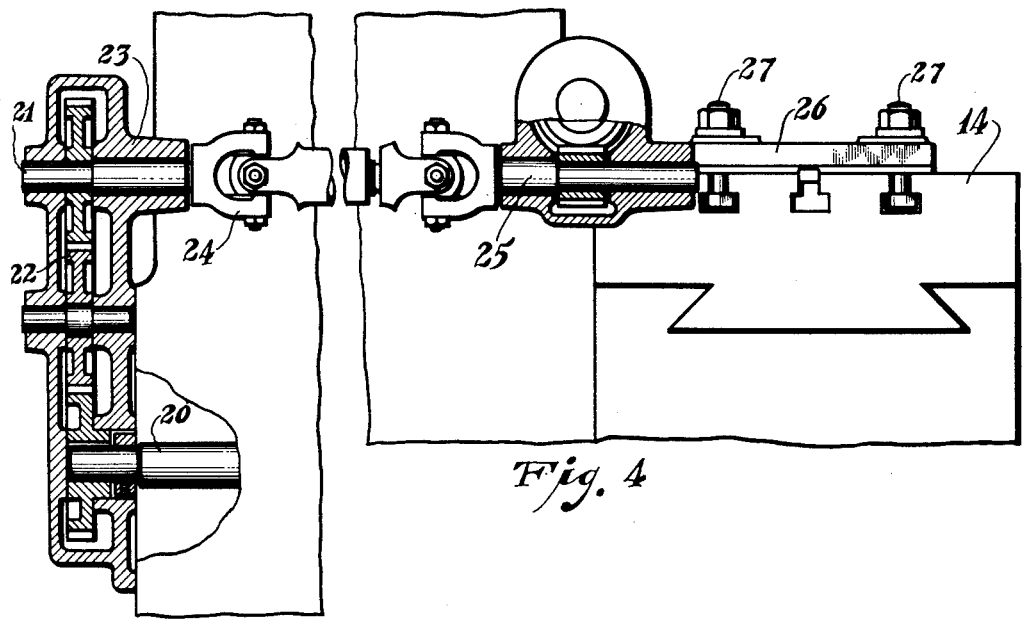
Figure 4 is a detail view of the transmission to the table, as viewed from the side of the machine in Figure 1.
Figures 5, 8:
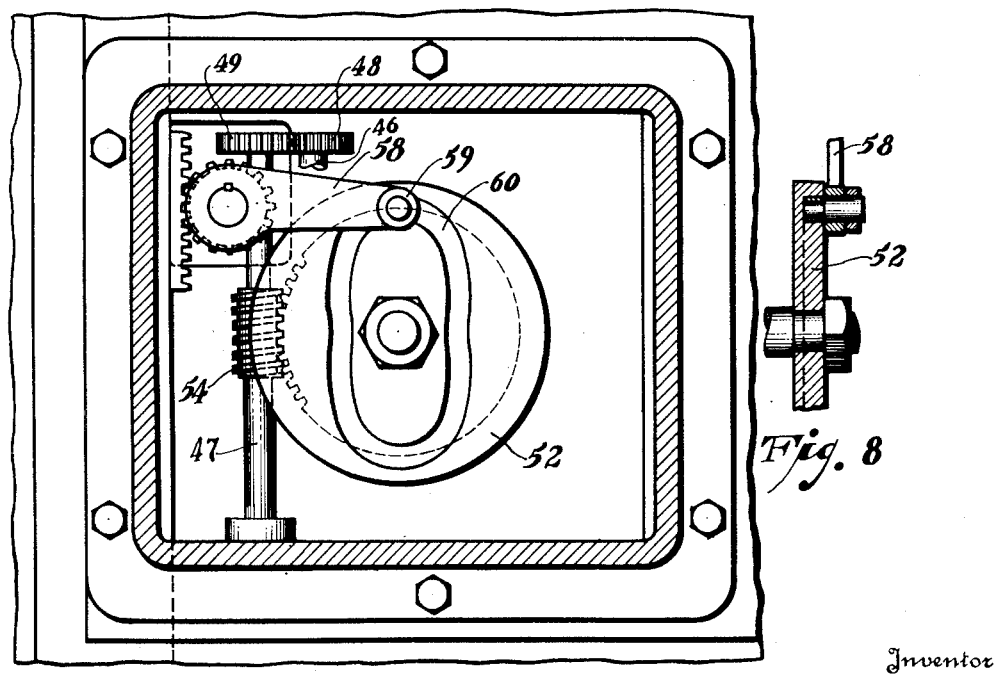
Figure 5 is a section on the line 5—5 of Figure 2.
Figure 8 is a detail of the spindle reciprocating cam and co-operating roller.

The table 14 has rotatably mounted thereon the work table 19 which is driven from a prime mover through the following transmission: Journaled in the column of the machine, as shown in Figure 4, is the shaft 20 which may be driven in any suitable manner, as by the prime mover of the machine. A shaft 21, parallel to the shaft 20 and driven thereby through the train of gears 22, is journaled in a bracket 23 attached to the rear of the column and drives, through the universal extensible shaft 24, a stub shaft 25. A bracket 26 is attached to the slide 14, as by the T bolts 27, and is provided with bearings for the shaft 25 and a long bearing 28 at right angles thereto for the drive shaft 29. Shaft 29 is actuated by the shaft 25 through the helical gears 30. The work table 19 is provided with a worm wheel 31, which is operatively connected with the worm 32, keyed to the shaft 33 which is journaled at one end in the bracket 34 and at the other end in the bracket 35. The shaft 29 extends into the bracket 34 and has splined thereon the slidable clutch member 36, for engagement with the clutch member 37 fixed to the end of the shaft 33. A pin 39, rotatably mounted in the bracket 34, has the eccentric portion 40 in engagement with the spool of the clutch member 36, and a handle 41 is provided for rotating the pin to engage and disengage the clutch.

The end of the shaft 33, which is journaled in the bracket 35, has a bevel gear 42 in engagement with a bevel gear 43 attached to one end of the universal extensible shaft 44 for actuating the spindle head reciprocating mechanism. A housing 45 is attached to the side of the column 11 and has journaled therein the vertical shaft 46 which is directly driven by the member 44. Parallel to the shaft 46 is the worm shaft 47 which is operated by the shaft 46 through the change gears 48 and 49 mounted upon the ends of the respective shafts. A cover 50 on the top of the housing 45 is removable for access to these gears, to facilitate making changes therein. A stub shaft 51 is rotatably mounted in the housing and has keyed thereto a cam 52 and a worm wheel 53, which is actuated by the worm 54 mounted on the shaft 47. From the transmission just described, it is apparent that whenever the table is rotated, the cam 52 will be simultaneously rotated therewith.

Figure 3:
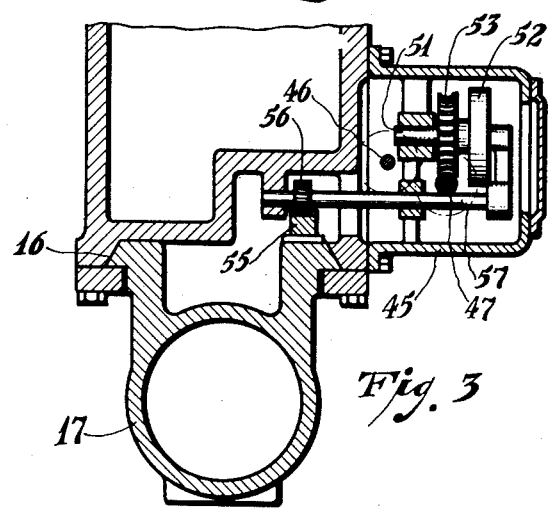
Figure 3 is a section on the line 3—3 of Figure 2.

The cutter spindle head 17 has fixed thereto, as shown in Figure 3, the rack 55. A gear 56, keyed to a shaft 57, engages the rack and is operated by a lever 58 fixed to one end of the shaft 57. The lever 58 has mounted in its free end the roller 59 for engagement with the cam track 60 of the sam 52. The cam track 60 may be given any configuration to thus move the cutter spindle up and down to suit the contour of the work it is desired to finish. Also, the cam 52 may be given a single rotation simultaneously with a single rotation of the work table 19, or any proportion of rotation desired, by means of the change gears 48 and 49.

One of the operations that may be performed on this machine is the milling of the cylindrical surface 61 of the raised boss on the work piece shown in Figure 7. Since the boss intersects the curvilinear surface 62 of the work piece, the elements of the surface 61 will vary in length and, due to this variation, the milling cutter must be moved up and down as the work rotates, in order to completely mill the surface in one revolution.

In the operation of the machine, the work is attached to the work table 19 and the slide 14 is moved until the cutter engages and is sunk into the work to the proper depth to effect the finished surface as shown in Figure 2. The work table 19 is then rotated by engagement of the clutch members 36 and 37 and the cutter is, at the same time, reciprocated by the cam 52.

After the work table has made a complete revolution, the clutch members 36—37 are disengaged, thus stopping the table. The saddle 14 may now be moved outward—that is, away from the column—by the handle 13a to replace the finished work piece by an unfinished work piece. By doing this, the operator does not disturb the relation of cutter and table, thus maintaining the proper depth of cut for each succeeding work piece and still preventing the possibility of spoiling any work piece on account of moving the cutter too far, as movement of the cutter too far in this case simply moves it away from the surface and not further into it.

It is of course understood that the operations could be reversed, in that the work may be positioned with respect to the cutter, as shown in Figure 6, and the saddle adjusted to give the desired depth of cut, while the slide may be reciprocated for the purposes of loading and unloading the machine.

It will be noticed that the cam 52 has a cam path suitable for finishing the particular work piece shown herein, but it will of course be understood that other cams may be substituted therefor, which have different shaped cam paths suitable for other shapes of work.

That which is claimed is:

1. A milling machine having a column, a cutter spindle head reciprocably mounted on said column, a slide carried by the column normal to the cutter spindle and surmounted with a work table, a drive shaft journaled on the slide for rotating the table, a transmission for reciprocating the spindle head and actuated by said drive shaft comprising a shaft journaled in a housing on the side of the column, a flexible connection between said shaft and drive shaft, a cam shaft rotatably mounted in the housing and having a worm wheel and a cam keyed thereto, a worm operatively connected to said worm wheel and actuated by the shaft through change speed gears, and means operated by the cam for reciprocating the spindle head.

2. A milling machine having a column, a knee, saddle and table mounted on the column for effecting adjustment in three directions with respect thereto, a rotatable work support mounted on the table, a cutter spindle journaled in the column and axially movable toward and from the work support, a drive shaft journaled on the table and movable therewith, a source of power in the column, a flexible driving connection extending therefrom to a rotatable element on the table for effecting constant rotation thereof, a clutch for coupling the drive shaft to said element, means actuated by said shaft in serial power transmitting relationship for effecting rotation of the work support and reciprocation of the spindle, said work support rotating means comprising a worm and worm gear, said spindle reciprocating means including a cam rotatably mounted on the column, and a flexible driving connection extending from the shaft to the column to maintain connection during three directional adjustment of the table.

3. A milling machine having a column, a knee, saddle and table mounted on the column for effecting adjustment in three directions with respect thereto, a rotatable work support mounted on the table, a cutter spindle journaled in the column and axially movable toward and from the work support, a drive shaft journaled on the table and movable therewith, a source of power in the column, a flexible driving connection extending therefrom to a rotatable element on the table for effecting constant rotation thereof, a clutch for coupling the drive shaft to said element, means actuated by said shaft in serial power transmitting relationship for effecting rotation of the work support and reciprocation of the spindle, said work support rotating means comprising a worm and worm gear, said spindle reciprocating means including a cam rotatably mounted on the column, a flexible driving connection extending from the shaft to the column to maintain connection during three directional adjustment of the table, a speed changer interposed between the flexible driven and cam for varying the number of reciprocations of the spindle per revolution of the work support, and rack and pinion means actuated by said cam for effecting reciprocation of the spindle.

4. In a milling machine having a saddle, a slide reciprocably mounted upon the saddle, a rotatable work table carried by the slide, a reciprocable cutter spindle mounted in said column with its axis lying in the plane of the axis of the work table, said plane being parallel to the direction of movement of the slide, means to move the slide to determine the depth of cut to be taken on the work, means to reciprocate the saddle to move the slide and table toward and from a loading position without disturbing the depth adjustment, and power driven means mounted on the slide for rotating the table and reciprocating the cutter spindle in timed relation to one another to mill a cylindrical surface having geometric elements of varying extent.

5. A milling machine having a column, a table supported by the column, a rotatable work support mounted on the table, a cutter spindle rotatably supported by the column, said spindle being adjustable in three planes relative to the table, a power driven shaft rotatably supported by the table, a source of power in the column, a clutch for coupling said shaft to the source of power, means jointly actuated by the shaft for effecting rotation of the work support and reciprocation of the spindle in timed relation with one another for finishing an irregular surface on the work, said means including gearing for effecting rotation of the table, a rotatable cam for effecting movement of the spindle, said cam being coupled to the gearing in serial power transmitting relationship, and additional means for manually traversing one of said members transversely of its axis of rotation to effect separation of the members to permit loading and unloading of the machine.

6. A milling machine having a column, a cutter spindle head reciprocably mounted in said column, a slide carried by the column, a work table rotatably mounted on the slide, mechanism carried by the slide for effecting rotation of the table including a bracket detachably connected to the end of the table, a pair of spiral gears journaled in the bracket, means to connect one of said gears to a source of power, a driven shaft connected to the other gear extending parallel to the direction of slide movement, a second bracket detachably connected to the table, a pair of clutch members journaled in the bracket, one of said clutch members being connected to said shaft, means coupling the other clutch member to the table and shifting means journaled in the bracket for coupling said clutch member to effect power rotation of the table.

WILLIAM D. AVERILL.